Dec. 2, 1930.    C. B. MIRICK    1,783,299
ANTENNA WEIGHT
Filed Dec. 6, 1929    3 Sheets-Sheet 1
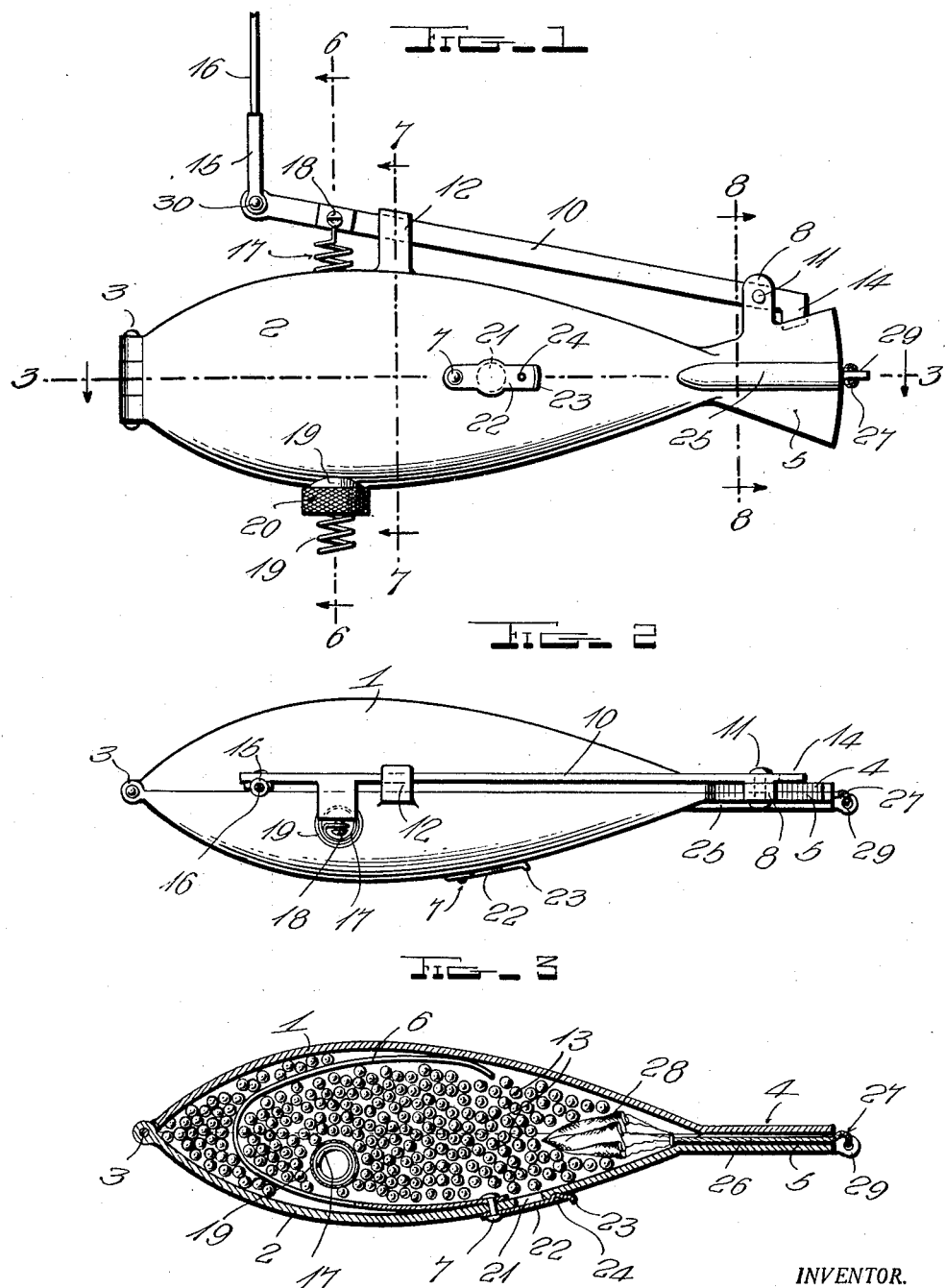
INVENTOR.
Carlos B. Mirick,
BY
Harold Todd.
ATTORNEY.

Dec. 2, 1930.      C. B. MIRICK      1,783,299
ANTENNA WEIGHT
Filed Dec. 6, 1929     3 Sheets-Sheet 2
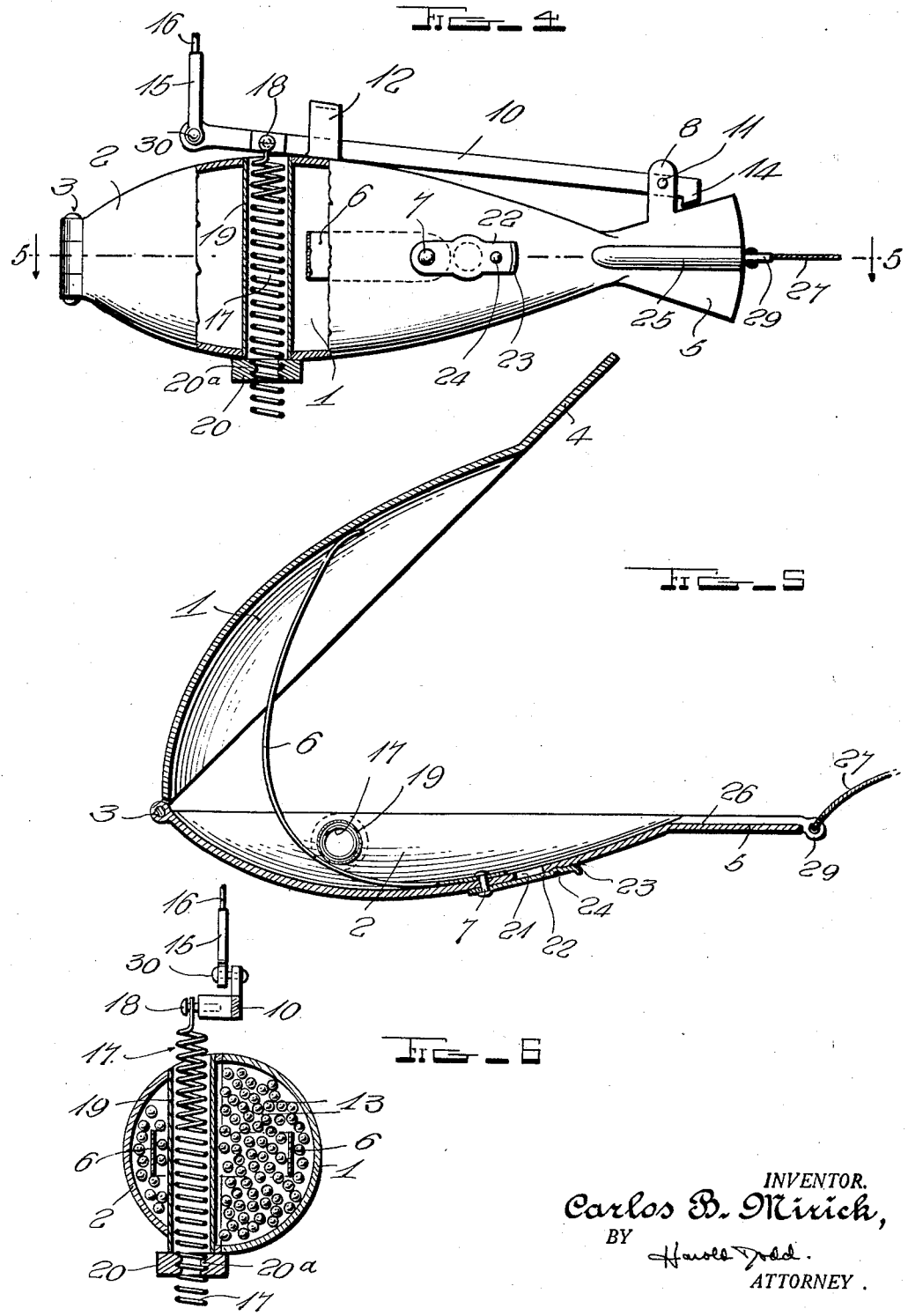

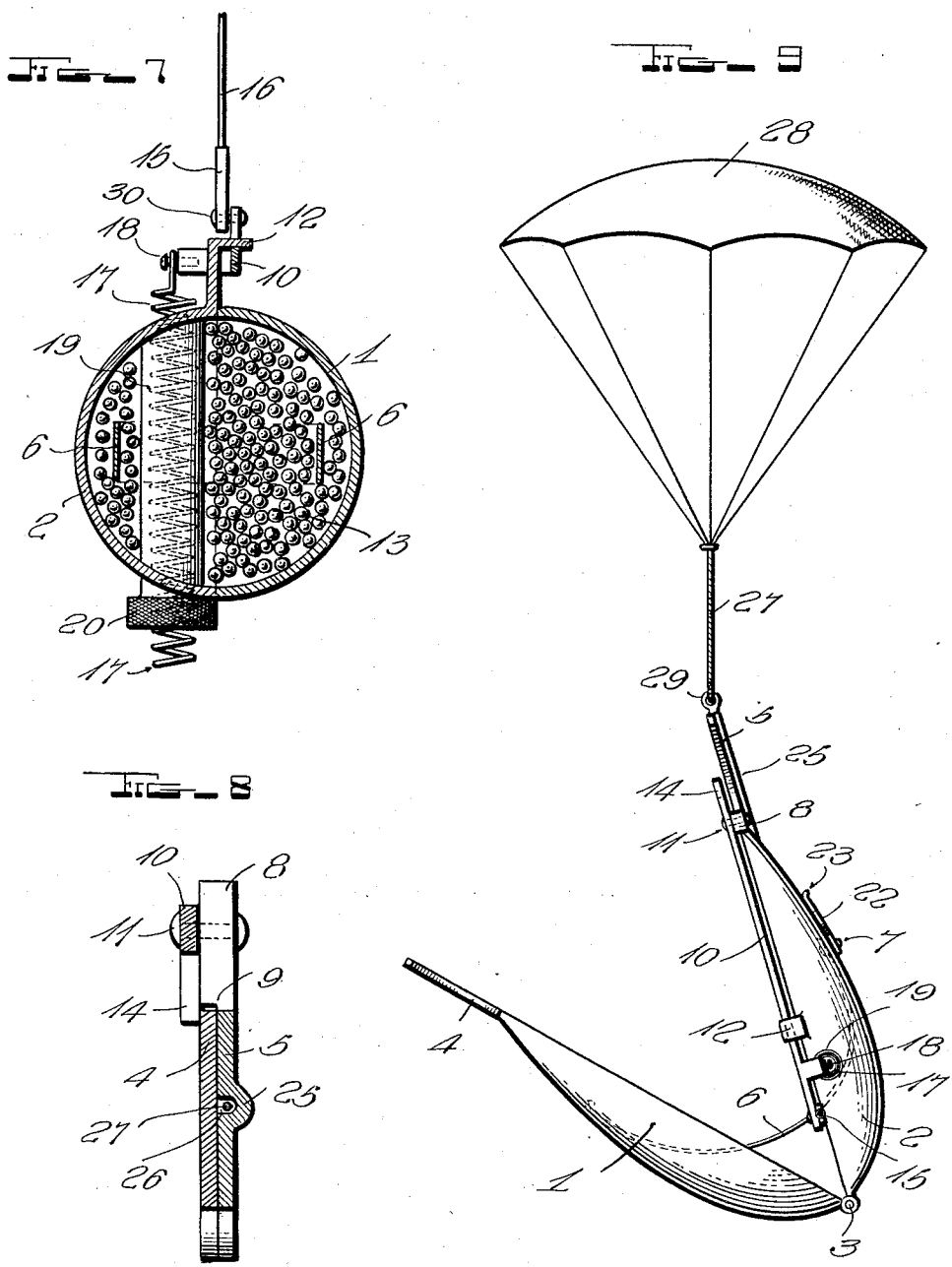

Patented Dec. 2, 1930

1,783,299

UNITED STATES PATENT OFFICE

CARLOS B. MIRICK, OF WASHINGTON, DISTRICT OF COLUMBIA, ASSIGNOR TO NATIONAL ELECTRICAL SUPPLY COMPANY, OF WASHINGTON, DISTRICT OF COLUMBIA, A CORPORATION OF VIRGINIA

ANTENNA WEIGHT

Application filed December 6, 1929. Serial No. 412,121.

My invention relates broadly to antenna systems for aircraft and more particularly to the construction of a weight for connection to a trailing wire antenna on aircraft.

One of the objects of my invention is to provide a construction of weight for connection to the trailing antenna wire of an aircraft in which the weight may be rendered substantially harmless in the event of accidental release of the weight during flight of the aircraft.

Another object of my invention is to provide a construction of weight on the trailing wire antenna on aircraft having portions thereof hinged to form an enclosure for loose shot, the portions of the antenna weight being arranged to be automatically opened in the event of accidental release of the weight from the aircraft for discharging the shot and thereby reducing the danger of the weight as a falling missile.

Still another object of my invention is to provide a construction of weight for the trailing wire antenna of an aircraft having a relatively light shell which may receive a mass of shot for normally fixing the mass of the weight when the trailing wire antenna is extended from the aircraft and is in use during flight, the shell having automatically opening means therein operative upon detachment of the weight from the antenna for discharging the weighted material within the shell and thus decreasing the concentrated mass of the weight when gravitating toward the earth.

A further object of my invention is to provide a construction of antenna weight for the trailing wire of an aircraft antenna wherein the weight includes a shell arranged to enclose a mass of shot therein for fixing the mass of the weight for normal operation with means for automatically opening the shell upon severance of the trailing wire antenna for discharging the weighted mass within the shell and reducing the danger of the weight as a missile in gravitating toward the earth.

Other and further objects of my invention reside in the construction of a weight for the trailing wire antenna on an aircraft wherein the abrupt falling of the weight en masse, upon accidental failure of the antenna wire, may be broken and the parts of the weight reduced from their concentrated gravitational effect and floated to earth in a manner avoiding the hazardous effects which may result from the dropping of a weight from substantial height.

My invention will be more fully understood from the specification hereinafter following by reference to the accompanying drawings, in which:

Figure 1 is a side elevation of an antenna weight constructed in accordance with my invention, showing the two halves in normally closed position; Fig. 2 is a top plan view of the antenna weight; Fig. 3 is a horizontal sectional view of the antenna weight taken on line 3—3 of Fig. 1; Fig. 4 is a view similar to Fig. 1 with parts broken away and shown in section, the antenna weight being shown in position after the antenna wire is broken; Fig. 5 is a horizontal sectional view of the weight taken on line 5—5 of Fig. 4; Figs. 6, 7 and 8 respectively are transverse vertical views taken on the correspondingly numbered lines of Fig. 1; and Fig. 9 is a side elevation showing the shot ballast discharged and the weight descending under the restraining influence of a parachute.

In aircraft radio communication, transmission of signals is effected by the utilization of a trailing wire antenna which is normally carried upon a reel and is extended from the aircraft by unreeling the wire during flight. The end of the antenna wire is normally weighted to secure the required extension of the wire which trails beneath the aircraft in a substantially vertical position during operation of the radio transmitter. Heretofore, the antenna weight has been made of lead weighing from four to eight pounds. It not infrequently happens that the antenna wire becomes damaged and breaks during flight, allowing the weight to fall. The weight then becomes a considerable menace to the safety of life and property below. A four pound weight dropped from a possible height of several thousand feet is a considerable menace to anything in its path and in fact may cause severe injury and destruction.

My invention provides an antenna weight which may be modified in its effective mass to be rendered substantially harmless in the event of accident and the detachment of the weight from the antenna wire. I provide a stream line casing of light weight material having a hollow interior. The parts of the stream line casing are hinged together at their forward extremities to receive a mass of loose shot. The parts of the casing are normally latched together for retaining the shot within the casing. A latched mechanism is provided which may be properly tensioned and connected to the antenna wire. So long as the antenna wire is connected to the latch mechanism during normal flight of the aircraft, the parts of the casing are maintained closed. Spring means are provided interiorly of the casing and tensioned to spread the parts of the casing immediately upon severance of the antenna wire for releasing the shot within the casing which may be distributed over a relatively wide area as the casing falls and thus avoid the en masse gravitational travel of the weight. A parachute is provided within the casing to break the fall of the casing and thus avoid hazards which may arise out of the dropping of the casing as a missile from a relatively great height.

Referring to the drawings in more detail, the parts of the casing are designated by reference characters 1 and 2 hinged at the forward extremity thereof as indicated at 3. The casing is formed of lightweight material, stream-lined in shape terminating in fins 4 and 5 at the rear thereof. A spring 6, secured at 7 to the interior of the side wall 2, tends to open up the two halves of the antenna weight which is normally prevented by a latch mechanism. The latch mechanism is pivoted upon a vertically extending member 8 which is integrally connected to the fin 5 as shown more clearly in Fig. 8. The member 8 extends over the fin 4 at the notched portion 9 thereof as shown in Fig. 8. The lever 10 is pivoted at 11 to the upward extension 8 on fin 5 and is limited in its upward movement by means of guide 12 which is integrally connected to part 2 of the shell. The rear end of the lever 10 is provided with a downwardly extending lug 14 which normally engages the side of fin 4, thus latching fins 4 and 5 in juxtaposition as shown in Figs. 2, 3 and 8. The opposite end of lever 10 is connected to a pivotally connected lug 15 at 30, which receives the end of trailing antenna wire 16. The lever 10 is connected to a coil spring 17 at the point 18 as shown. The coil spring 17 extends through tubular member 19, projecting laterally through the part 2 of the enclosing shell. A screw device 20 engages the convolutions of the spring 17 and by adjusting the position of the screw device 20 which is interiorly screw threaded as shown at 20a to a desired position upon the coil spring 17, that degree of spring tension may be placed on lever 10 to balance the normal pull of the antenna wire during flight of the aircraft.

The interior of the shell is filled with the loose lead shot 13 which is loaded into the shell through the aperture 21, which is thereafter closed by the plate 22 which is pivotally mounted on the shell 2 by the means 7 which screws the spring 6 interiorly of the shell. The plate 22 has an upstanding finger piece 23 to facilitate angular movement thereof into a latched position. The plate 22 is provided with a detent 24 adapted to enter the exterior side wall of the shell 2 when the plate 22 is moved into closed position over aperture 21. The fin 5 is centrally outstruck forming a longitudinally extending rib 25 and an internal depression 26 to receive the cord 27 of a foldable parachute 28. The cord 27 of the parachute passes through a ring member 29 formed in the end of fin 5. When the parts of the shell 1 and 2 open as represented in Fig. 9, the parachute is released from the interior of the casing and opens as shown in Fig. 9, thereby enabling the shell to be floated to earth without hazardous effects.

The spring tension 17 is so adjusted that under normal condition the parts of the shell are maintained latched by the lug 14 which is held in position by the normal pull of the antenna wire 16. Upon severance of the antenna wire 16, spring 17 operates to move lever 10 and remove lug 14 from its position adjacent fin 4 thus enabling the parts of the shells 1 and 2 to open as illustrated in Fig. 9. The casing portion of the weight is constructed of light material and may be floated to earth after the load in the form of shot 13 has been discharged and thereby avoid hazardous or destructive results.

While I have described my invention in certain of its preferred embodiments I desire that it be understood that modifications may be made and that no limitations upon my invention are intended other than are imposed by the scope of the appended claims.

What I claim as new and desire to secure by Letters Patent of the United States is as follows:

1. An antenna weight comprising a pair of shell portions hinged together at one end for enclosing a load therein, an antenna wire, a latching mechanism connected with said antenna wire and secured to said antenna weight for normally maintaining the portions of said shell in locked engagement, and means for tripping said latch mechanism for spreading the parts of said shell when the tension on said antenna wire is released.

2. An antenna weight comprising a pair of stream-line shell portions hinged together at one end and terminating in abutting fins at the opposite end, a lever pivotally mounted on one of said fins and having a lug thereon engaging the other of said fins for locking the portions of said shell in juxtaposition, spring means for normally subjecting said lever to tension, an antenna wire connected to the end of said lever for exerting a force on said lever for normally overcoming the effect of said spring means, a load carried within said shell, and means constantly tending to separate the parts of said shell for discharging the load therein when the tension of said spring means overcomes the force exerted upon said antenna wire.

3. An antenna weight comprising a pair of shell portions hinged at one end, a latching mechanism for normally securing said shell portions in closed position with respect to each other for enclosing a load within said shell portions, a spring device extending through said shell for subjecting said latching mechanism to tension, a connection between said latching mechanism and an antenna wire for normally overcoming the effect of said spring device and maintaining said shell portions in latched juxtaposition, and means within said casing tending to spread said shell portions for discharging the load therein upon release of the pull of the antenna wire upon said latch mechanism.

4. In an antenna weight, a divided streamline shell enclosing a distributed load, a latch mechanism for normally maintaining said shell closed, an antenna wire connected to said latch mechanism, and means actuated by the release of the pull of said antenna wire for actuating said latch mechanism for effecting the opening of said shell and the discharge of the load therein.

5. An antenna weight comprising a streamline shell divided into a plurality of portions, means between said portions for urging said shell to an open position, a lever pivotally mounted with respect to said shell for normally latching the parts of said shell in closed position for retaining a load therein, a connection from an antenna wire to said lever operative upon the release of the pull of the antenna wire upon said lever for spreading the portions of the shell and releasing the load carried therein.

6. An antenna weight comprising a plurality of sections hingedly connected together, means between said sections tending to spread said sections apart, a latching mechanism normally securing said sections in closed positions for carrying a load therein, a trailing antenna wire connected to said latching mechanism and means operative upon the release of pull on said antenna wire for effecting an opening of the casing formed by said sections for releasing the load therein.

7. An antenna weight comprising a pair of sections hingedly connected together, means interlocking said sections with respect to each other to form a hollow shell for receiving shot to form a weighted mass, means within said shell tending to spread said sections for the discharge of the weighted mass therein, latching mechanism for normally securing said sections together, a connection between a trailing wire antenna and said latching mechanism for normally maintaining said latching mechanism in position for locking said sections adjacent each other, and means operating against the pull of the trailing antenna wire for disengaging said latching mechanism when said antenna wire becomes detached.

8. An antenna weight comprising a multiplicity of separable sections hingedly connected together forming a shell for receiving a weighted mass, a latching mechanism carried by said shell, a connection between a trailing wire antenna and said latching mechanism for normally maintaining the sections of said shell in juxtaposition for receiving the weighted mass, spring means extending through said sections and effective to move said latching mechanism upon detachment of said antenna wire, and a parachute device normally housed within said shell and operative upon the opening of the parts of said shell for floating said shell to earth.

9. An antenna weight comprising a multiplicity of separable sections hingedly connected together and movable to form a closed shell for receiving a weighted mass, a connection between the antenna weight and a trailing wire antenna for aircraft, and a parachute device normally housed within said shell and arranged to become effective upon the detachment of said weight from the antenna wire for floating said shell to earth.

10. An antenna weight comprising a plurality of sections hingedly connected together forming a hollow shell for receiving a weighted mass, a latching mechanism, a connection between said latching mechanism and a trailing wire antenna, and a parachute device housed within said shell and operative upon the actuation of said latching mechanism by detachment of said weight from an aircraft for floating said shell to earth.

CARLOS B. MIRICK.